W. S. A. WILDER.
HAY PRESS.
APPLICATION FILED APR. 26, 1915.
1,181,497.
Patented May 2, 1916.
3 SHEETS—SHEET 2.
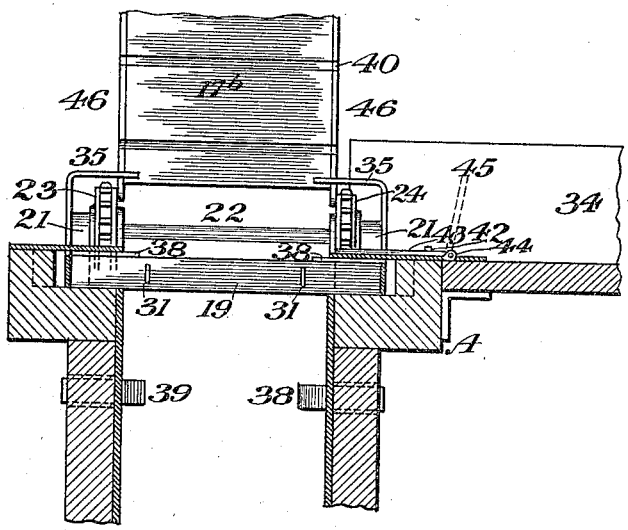
Fig. 3.
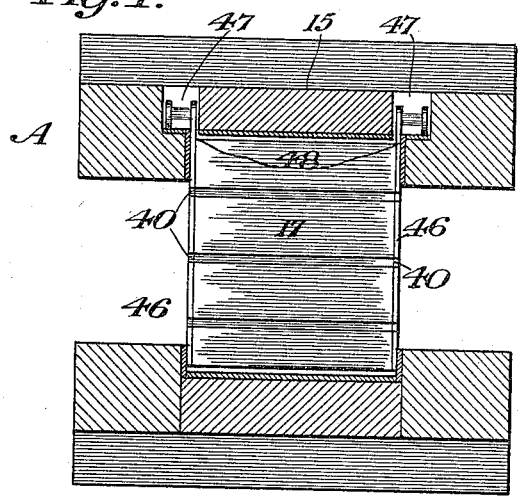
Fig. 4.
Fig. 5.
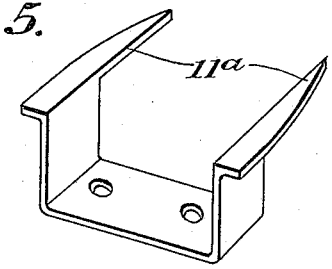
WITNESSES:
L. J. Forde
Thos. Kastberg
INVENTOR
William S. A. Wilder.
BY G. H. Strong
ATTORNEY

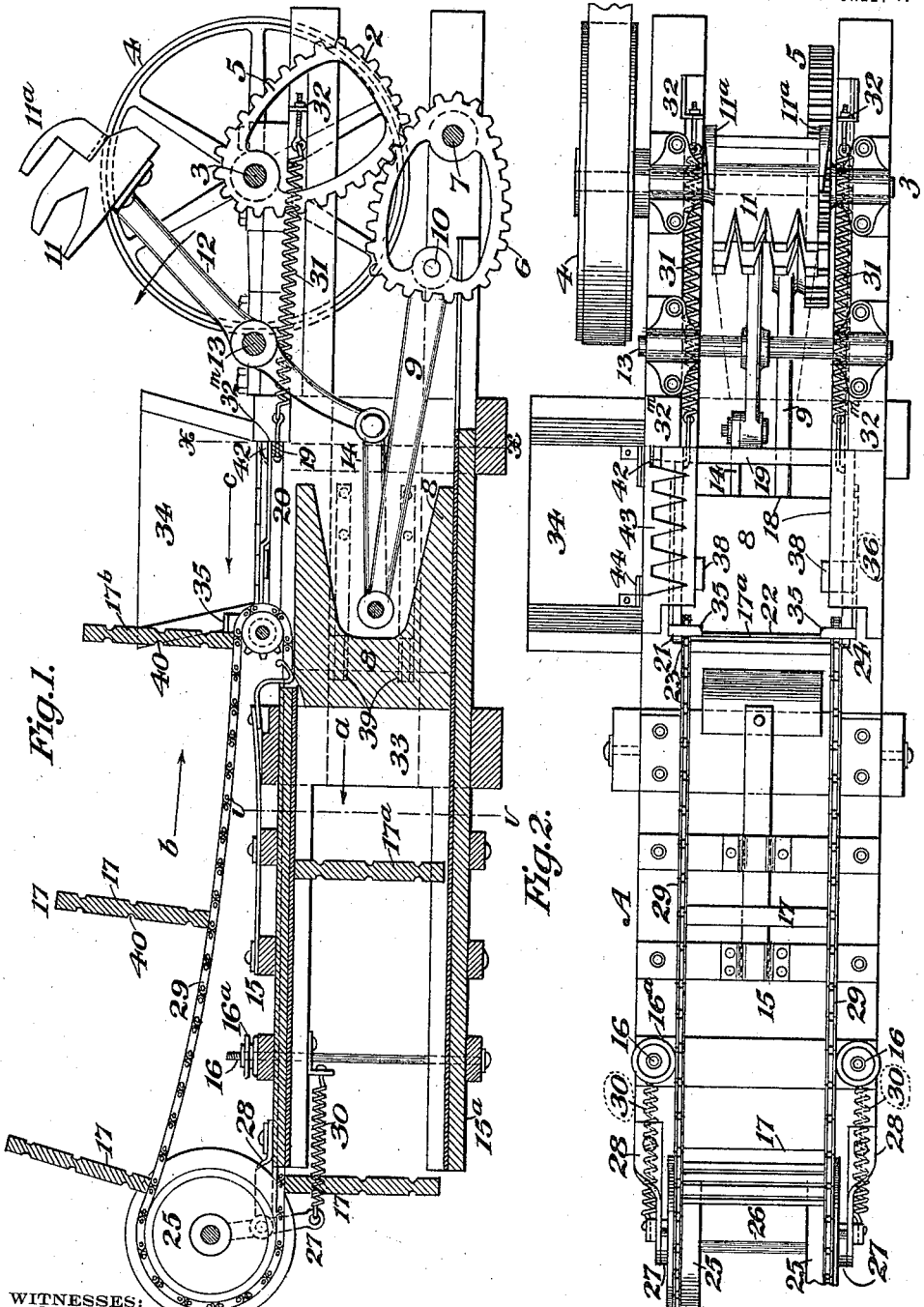

W. S. A. WILDER.
HAY PRESS.
APPLICATION FILED APR. 26, 1915.

1,181,497.

Patented May 2, 1916.
3 SHEETS—SHEET 3.

WITNESSES:
L. J. Forde
Thos. Castberg

INVENTOR
William S. A. Wilder
BY G. H. Strong
ATTORNEY

UNITED STATES PATENT OFFICE.

WILLIAM S. A. WILDER, OF ANDERSON, CALIFORNIA.

HAY-PRESS.

1,181,497. Specification of Letters Patent. Patented May 2, 1916.

Application filed April 26, 1915. Serial No. 23,836.

*To all whom it may concern:*

Be it known that I, WILLIAM S. A. WILDER, a citizen of the United States, residing at Anderson, in the county of Shasta and State of California, have invented new and useful Improvements in Hay-Presses, of which the following is a specification.

This invention relates to improvements in hay presses.

The object of the present invention is to provide a simple, substantially, easily operated hay press which is continuous in operation, and which is so constructed that the follower blocks will be automatically delivered to the baling chamber the moment sufficient hay to form a bale has been delivered thereto.

Further objects will appear hereinafter.

The invention consists of the parts and the construction and combination of parts as hereinafter more fully described and claimed having reference to the accompanying drawings, in which—

Figure 6:
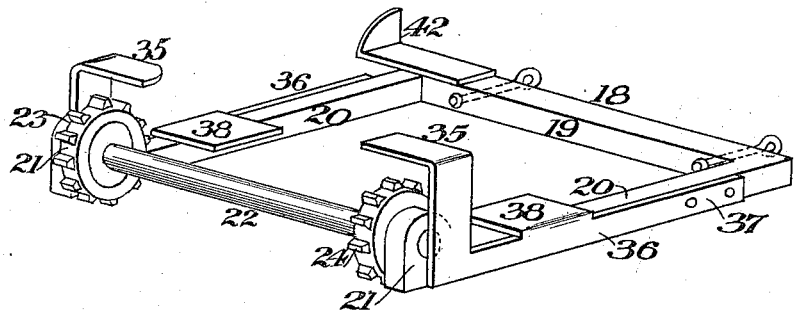
Figure 7:
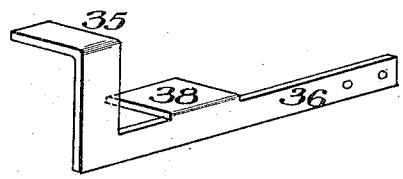
Figure 8:
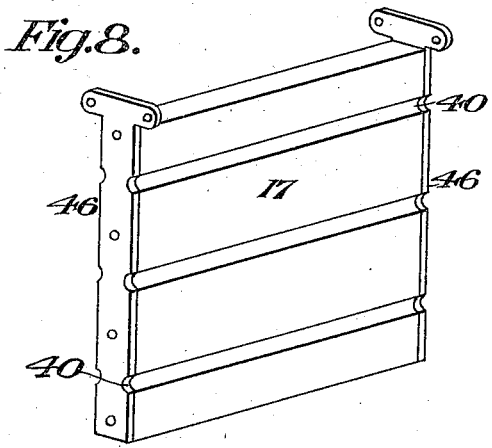

Figure 1 is a longitudinal vertical section through the hay press. Fig. 2 is a plan view of same. Fig. 3 is a cross section on the line *x—x* of Fig. 1. Fig. 4 is a cross-section on the line *v—v* of Fig. 1. Fig. 5 is a perspective view of the tripping cam. Fig. 6 is a perspective view of the sliding frame. Fig. 7 is a perspective view of one of the spring arms 36. Fig. 8 is a perspective view of one of the follower blocks.

Referring to the drawings, A indicates the main frame of the press which may be constructed in any suitable manner. Suitably journaled at one end of the frame, as at 2, is the drive shaft 3 with connected pulley 4, and keyed to the shaft 3 is an elliptical shaped gear 5 which intermeshes with a similarly shaped gear 6, secured upon a shaft 7, journaled in the lower part of the frame.

8 indicates the follower head, which, in this instance, is reciprocated through a link 9, connecting with a crank pin 10, secured on the face of the gear 6. The press is also provided with a tamping head 11, secured upon an arm 12, which is pivotally mounted on a shaft 13. Oscillatory movement is transmitted to the tamping head 11 through a link 14 connected at one end to the follower head, and at the other end to the lower end of the arm 12. The discharge end of the baling press is constructed in the usual manner, being provided with an upper pivotally mounted adjustable frame 15, and adjusting screws 16 by which the outer discharge end of the press may be increased or decreased in size, as the case may be.

The main novelty in this invention resides in the means and connected operating mechanism for automatically delivering the follower blocks 17 to the baling chamber when sufficient hay to form a bale has been delivered thereto. This part of the mechanism is constructed and operated in the following manner: 18 indicates in general a sliding frame which consists of an end cross bar 19 and side bars 20. Journaled in upwardly extending projections 21, formed on the outer ends of the side bars 20, is a shaft 22 upon which is secured a pair of sprocket wheels 23 and 24. 25 indicates a pair of idler drums mounted upon a shaft 26 which is secured in the outer ends of a pair of rocker arms 27, pivotally supported with relation to the adjustable frame 15 in rearwardly extending journal members 28. 29 indicates a pair of endless sprocket chains which pass over the sprocket wheels and idler drums, as indicated, and suitably secured to the chains 29, between same, is a suitable number of follower blocks 17. The lower ends of the rocker arms 27 are connected with coil springs 30 for the purpose of throwing the idler drums 25 into a position where the greater part of the slack will be taken out of the chains 29. The end cross bar 19 of the sliding frame 18 is connected with a pair of springs 31, the opposite ends of which are adjustably secured, as at 32, to the sides of the main frame A. The movement of the sliding frame 18 in the direction of the pull of the springs 31 is limited by shoulders 32, formed in the sides of the frame, while movement of the frame in the opposite direction is limited by a tripping mechanism hereinafter to be described.

In operation, when baling hay, it will be understood that reciprocal movement is transmitted to the follower head 8 through means of the driving pulley 4, shaft 3 and intermeshing gears 5 and 6. It will also be understood that simultaneous movement is transmitted through the link 14 to operate the tamping head 11. With the parts thus set in operation it is only necessary to deliver hay to the baling chamber 33 through the feed chute 34 in any suitable manner. The hay thus delivered through the feed chute is tamped down into the main baling chamber 33 by the oscillating movement of the tamping head 11. The hay thus tamped down into the baling chamber is then forced forward in the direction of arrow $a$, against a follower block as $17^a$, where it is compressed by the follower head. A continuous delivery of hay will thus increase the distance between the follower block $17^a$ and the follower head 8 and cause the follower block with connected chains to move toward the discharge end of the press in the direction of arrow $a$, while the follower block $17^b$, which is carried on the upper side of the chains will be traveling in the direction of arrow $b$, where it will be consecutively delivered to the baling chamber.

Referring to Fig. 1, it will be seen that the follower block $17^b$ has assumed a position where its movement in the direction of arrow $b$ has been stopped by a pair of upwardly and inwardly extending lugs 35. These stop lugs are mounted on a pair of spring arms 36, secured, as at 37, to the outside of the side bars 20. The spring arms 36 are further provided with a secondary pair of inwardly extending lugs 38, which are provided for the purpose of disengaging the lugs 35 with the follower head $17^b$, when a sufficient amount of hay to form a bale has been delivered into the baling chamber 33. A constant delivery of hay through the feed chute 34 into the baling chamber 33 will very soon accumulate to a desired quantity between the follower blocks $17^a$ and the retaining hay lugs 39, of which there is any suitable number in the sides and top of the frame; or, in other words, a sufficient pressure or pull will be transmitted through the follower block $17^a$ and chains 29 to the sliding frame 18 upon which the sprockets 23 and 24 are mounted, so that this will move in the direction of arrow $c$ against the tension or pull of the springs 31. The forward movement thus transmitted to the sliding frame 18 will soon cause the lugs 38 to assume a position where they will be engaged by a pair of cam arms $11^a$, secured to the tamping head 11. The tapering projections or cams $11^a$ engaging with the outer faces of the secondary lugs 38 will spread these, with connected arms 36 and primary lugs 35, out a sufficient distance to release the follower block $17^b$. The follower block thus released will immediately allow the sprocket wheels with connected chains to turn and relieve the tension upon the follower block $17^a$, permitting this to travel forward the same distance that the released block $17^b$ travels downward or around the outer periphery of the sprocket wheels. The forward movement of the follower head 8 will then engage with the follower block $17^b$ which has been swung into the baling chamber and force this beyond the retaining lugs 39. The continuous delivery of hay will thus begin to deposit between the follower block $17^b$ and the hay retaining lugs 39 and force the volume of hay previously deposited between the block $17^a$ and the block $17^b$ into a position where it may be wired, the blocks 17 being provided on both sides with the usual wire threading grooves 40. The sliding frame 18 will also assume its normal position against the shoulders 32 the moment the follower block $17^b$ is released with relation to the retaining lugs 35, being returned to normal position by the springs 31.

It can be seen that a new follower block cannot be delivered into the baling chamber until the hay within the chamber has been so highly compressed that the sliding frame 18 is pulled forward by the medium of the follower block $17^a$ and chains 29 with connected sprockets 23 and 24. Thus it can be seen that each bale will be compressed to practically the same pressure, which compression pressure is regulated by the screws 16. The compression of the bale may be increased or decreased by adjusting the position of the upper pivoted frame 15 with relation to the lower bottom portion of the frame indicated at $15^a$. This is accomplished in the usual manner by increasing or decreasing the tension of the adjusting nut $16^a$ on the screw 16.

For the purpose of removing any hay which may be hanging over the edge of the baling chamber, the moment the sliding frame 18 moves ahead to bring the secondary lugs 38 into tripping position, or, in other words, to release the follower block $17^b$, a cam 42 has been provided on the sliding frame which is so positioned as to engage with the lower surface of a fork-shaped frame 43 pivotally mounted, as at 44, in the edge of the feed chute.

Referring to Figs. 1, 2 and 3, it will be seen that the forward sliding movement of the frame 18 will cause the cam 42 to pass under the pivoted frame 43 and elevate this into the dotted line position indicated at 45; thus removing any overhanging hay from the edge of the baling chamber and avoiding such trouble as jamming of the follower blocks 17 as this swings into the baling chamber.

The follower blocks 17 are secured to the sides of the chains 29 by strips 46 which extend down the sides of the blocks, and the lower sides of the chains are adapted to travel in grooves 47 formed in the adjustable top frame 15. The inner edges of the grooves are slotted, as indicated at 48, to permit the passage of the side strips 46 to which the follower blocks are secured, and the vertical position of the follower blocks within the baling chamber is maintained for the reason that one or more bales or partly compressed bales are always in position within the baling chamber. Furthermore, the friction at the discharge end is so great that it will be impossible to twist or derange the form of the bale.

A hay press provided with the automatic follower block feeding system here shown is more efficient and easier to operate than others. No extra men are needed for the purpose of placing the blocks in position, nor is there any necessity of guess work, as each block is dropped into position when sufficient pressure has been exerted upon the hay by the follower head to move the sliding frame 18 against the pull of the springs 31. The bales are thus all uniform in size and practically equal in weight. The automatic operation of the different parts, together with the pivoted rake, indicated at 43, insures perfect operation.

Having thus described my invention, what I claim and desire to secure by Letters Patent is—

1. The combination with the baling chamber, follower head and connected operating mechanism in a hay press, of a plurality of follower blocks, means for automatically delivering said blocks to the baling chamber when a predetermined volume of hay has been delivered to the baling chamber, said means including a slidable frame, holding springs therefor, spring-pressed stops to retain the follower, and means to separate the stops and release the follower.

2. A hay press comprising, in combination, a frame, a baling chamber formed within the frame, a follower head, means for reciprocating said head, a plurality of connected follower blocks, means for automatically delivering each follower block successively to the baling chamber when sufficient hay to form a bale has been compressed to a predetermined pressure, said means including a spring controlled, longitudinally slidable frame with transversely movable spring-pressed stops against which a follower block is arrested, and a swinging cam to separate the stops and allow the follower block to move into the baling chamber.

3. A hay press comprising, in combination, a frame, a baling chamber formed within the frame, a follower head, means for reciprocating said head, a sliding frame mounted above the baling chamber, a pair of sprocket wheels journaled in said frame, a pair of idler drums on the end of the main frame, a pair of endless chains passing over said sprockets and drums, a plurality of follower blocks secured to said chains, stops on the sliding frame for temporarily stopping the forward movement of the follower blocks, and means for releasing said stops when sufficient hay to form a bale has been compressed to a predetermined pressure.

4. The combination with the main frame, baling chamber, follower head, tamping head and connected operating mechanism in a hay press, of a sliding frame mounted above the baling chamber, stop shoulders formed on the main frame, springs connected with the sliding frame to normally hold the sliding frame against the stop shoulders, a pair of sprocket wheels journaled in the sliding frame, a pair of spring-actuated rocker arms on the main frame, a pair of idler drums journaled in said rocker arms, a pair of chains passing over said sprockets and idler drums, a plurality of follower blocks between the chains secured to the chains, a pair of spring arms secured to the sides of the sliding frame, one on each side, a stop lug on each spring arm projecting into the path of travel of the follower blocks adapted to temporarily retain the follower blocks, and means for moving the stop lugs out of the path of travel of the follower blocks to release same when sufficient hay to form a bale has been compressed to a predetermined pressure.

5. The combination with the main frame, baling chamber, follower head, tamping head and connected operating mechanism in a hay press, of a sliding frame mounted above the baling chamber, stop shoulders formed on the main frame, springs connected with the sliding frame to normally hold the sliding frame against the stop shoulders, a pair of sprocket wheels journaled in the sliding frame, a pair of spring actuated rocker arms on the main frame, a pair of idler drums journaled in said rocker arms, a pair of chains passing over said sprockets and idler drums, a plurality of follower blocks between the chains secured to the chains, a pair of spring arms secured to the sides of the sliding frame, one on each side, a stop lug on each spring arm projecting into the path of travel of the follower blocks adapted to temporarily retain the follower blocks, a pair of secondary lugs on the spring arm, and a pair of cam members secured to the tamping head adapted to engage with the secondary lugs to spread the spring arms and stop lugs when sufficient hay to form a bale has been compressed to a predetermined pressure.

6. In a baling press of the character described, a follower, means to reciprocate the same, endless traveling chains with follower blocks attached thereto at intervals, spring-pressed, transversely separable stops by which a follower block is arrested above the baling chamber, a lever with a tamping head adapted to pack the material into the chamber between the reciprocation of the follower, and a cam carried by the tamping head and adapted to separate the spring stops and release the follower block to enter the chamber and compress the contents between itself and a preceding block.

In testimony whereof I have hereunto set my hand in the presence of two subscribing witnesses.

WILLIAM S. A. WILDER.

Witnesses:
JAMES F. BEDFORD,
WILLIAM P. DONNELLY.

Copies of this patent may be obtained for five cents each, by addressing the "Commissioner of Patents, Washington, D. C."